United States Patent [19]

Halpine

[11] 4,188,015
[45] Feb. 12, 1980

[54] BALL VALVE HAVING IMPROVED SEALING CAPABILITY

[76] Inventor: Joseph C. Halpine, P.O. Box 2903, Tulsa, Okla. 74101

[21] Appl. No.: 885,801

[22] Filed: Mar. 13, 1978

[51] Int. Cl.$^2$ ............................................. F16K 5/06
[52] U.S. Cl. .................................. 251/315; 251/172
[58] Field of Search ....................... 251/172, 306, 315

[56] References Cited

U.S. PATENT DOCUMENTS

| | | | |
|---|---|---|---|
| 3,208,718 | 9/1965 | White | 251/172 |
| 3,408,037 | 10/1968 | Kaiser et al. | 251/315 |
| 3,473,554 | 10/1969 | King | 251/315 |
| 3,726,504 | 4/1973 | Kormos et al. | 251/306 |
| 4,150,810 | 4/1979 | Laignel et al. | 251/315 |

FOREIGN PATENT DOCUMENTS

| | | | |
|---|---|---|---|
| 1158357 | 6/1958 | France | 251/315 |
| 1363146 | 5/1964 | France | 251/315 |
| 331647 | 9/1958 | Switzerland | 251/315 |
| 824649 | 12/1959 | United Kingdom | 251/315 |

*Primary Examiner*—William R. Cline
*Assistant Examiner*—H. Jay Spiegel
*Attorney, Agent, or Firm*—Head & Johnson

[57] ABSTRACT

A ball valve having improved sealing capability, which has a conventional housing, with a flow opening, and means for positioning and rotating the ball inside of the housing. There is at least one metal seal ring which is positioned and sealed inside of the housing, in a position where it is coaxial with the flow opening through the housing. It has a conical surface which includes a resilient seat ring, which faces and is spaced a selected distance from the surface of the ball. The ball has at least one circular wire ring, made of a selected diameter of wire. The ring is attached and sealed to the surface of the ball as a circular ridge in such a position that when the valve is closed the ridge will be coaxial with the seal ring and will penetrate into the surface of the resilient seat ring a selected distance in order to create sufficient internal pressure to seal against fluid pressure in the flow opening through the valve.

3 Claims, 2 Drawing Figures

BALL VALVE HAVING IMPROVED SEALING CAPABILITY

BACKGROUND OF THE INVENTION

1. Field of the Invention

This invention lies in the field of fluid control devices. More particularly it concerns an improvement in the construction of the conventional ball valve.

Still more particularly this invention concerns an improvement in the contact between the ball and a resilient seat ring inside of the valve whereby the surface of the ball has a circular ridge which is formed by attaching and sealing a circular wire ring of selected diameter to the surface of the ball, such that when the ball is in a closed position this ridge will be in coaxial position with the resilient seat ring, and will provide a high unit pressure of contact between the ridge and the resilient seat.

2. Description of the Prior Art

Ball valves have been in use in industry for many years and have a certain filed of usefulness in the control of fluids. One of the difficulties with prior art ball valves is that because of the large radius of curvature of the ball when it is in contact with a resilient seat ring, in order to provide a high unit pressure of contact so as to create a seal against high fluid pressure in the inlet passage of the housing, there must be a large physical force of contact between the resilient seal ring and the ball.

By adding the ridge of small radius of curvature to the surface of the sphere, such that the ridge can penetrate into and form a depression in the surface of the seat ring, a high unit compression in the resilient material can be provided with a minimum total force between the seat ring and the ball ridge, providing a much more satisfactory force situation.

SUMMARY OF THE INVENTION

It is a primary object of this invention to provide a ball valve having an improved sealing capability.

It is a further object of this invention to provide a ball valve having a circular ridge on the surface of the ball, in such a position that when the valve is closed the ridge will be in coaxial contact with a resilient seat ring, and will provide a high internal unit pressure condition, for minimum force of contact between the ball ridge and the seal ring.

These and other objects are realized and the limitations of the prior art are overcome in this invention by providing a ball valve with more or less conventional housing, ball and shaft means to support and rotate the ball, and so on. The improvement lies in the construction of a seal ring having a resilient seat ring, which is inserted into an appropriate groove in the seal ring, so that the resilient surface, which will be substantially conical will be substantially tangent to, but spaced from the surface of the ball.

The ball is improved by the addition of a circular coaxial ridge on its surface formed by attaching and sealing a circular wire ring of selected wire diameter. In operation when the valve is closed the ridge formed by the wire will be of such diameter as to depress the surface of the resilient seal ring so that sufficient internal compression will be generated in the resilient material to seal the fluid pressure in the input opening of the valve.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
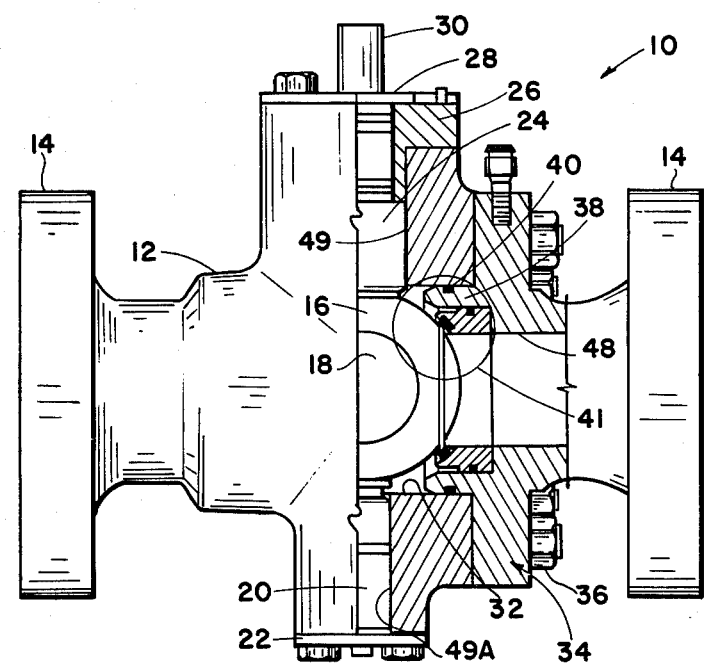
FIG. 1 represents a view in partial cross section of the improved valve.

Referring now to the drawings, there is shown in FIG. 1, a view partly in cross section of the ball valve of this invention. This is indicated generally by the numeral 10. The improved valve has a housing 12 with an internal flow opening 48, through the center of the housing, which is terminated by means of flanges 14 for connection to pipes in a conventional manner.

There is a transverse opening 49,49A through the housing which is perpendicular to the flow opening 48.

A spherical ball 16, has an axial opening 18 through it. The diameter of the opening 18 is preferably the same as that of the flow opening 48 in the housing, so that when the ball is turned with its axis coincident with that of the flow opening 48, the two openings will be the same diameter and will provide a continuous opening through the valve.

Because of the large diameter of the ball compared to the flow opening 18 through it, it is necessary to have on one side of the valve a large opening 32 for inserting the ball. This opening 32 is coaxial with the flow opening 48, and is covered by a flange means 34, which is centered in the opening 32 by means of a tubular projection 38. The flange means 34 is attached to and is made part of the housing by means of nuts 36, which are screwed to studs inserted into the wall of the housing. The flange means 34 also supports the connecting flange 14.

The ball is supported in an axis perpendicular to the flow opening 48 by means of short shafts such as 20 in the opening 49A of the housing, which is held in position by a cover plate 22, and a shaft 24 which is held in position in opening 49 by a flange 26. The shaft 24 has an extension 30 which extends out through the top plate 28 for the rotation of the ball. Both of the short shafts 20 and 24 are sealed in their respective openings 49A and 49 by means of "O" rings or similar means. All of this construction is conventional and further detail need not be provided.

Figure 2:
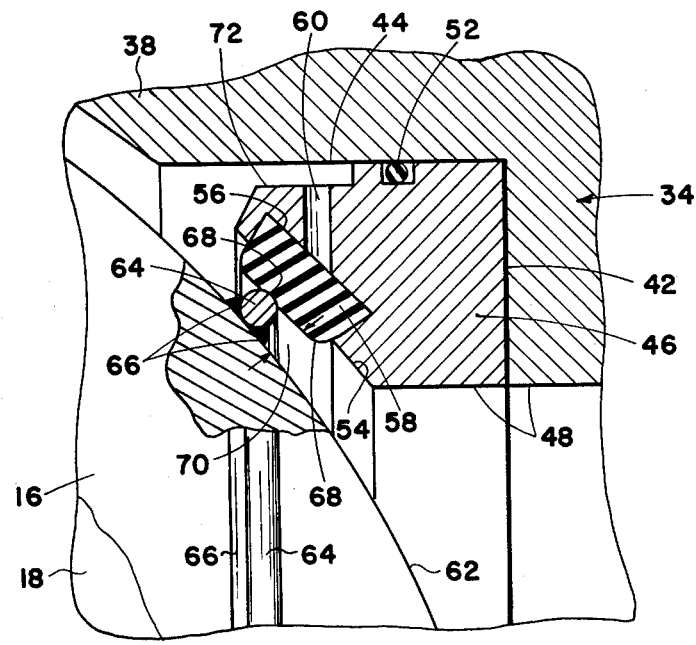
FIG. 2 showns in enlarged cross section a view of a portion of FIG. 1.

Referring now to FIG. 2 which showns an enlarged portion of FIG. 1 included in the circle 41. Shown in FIG. 2 is a portion of the flange 34, and the extension 38. This includes a shoulder 42 and a circumferential wall 44, which are adapted to seat a metal seal ring 46, which fits against the shoulder and is sealed against the circumferential surface 44 by means of an "O" ring 52, for example. This metal seal ring has a conical surface 54, which faces and is substantially tangent to, a sphere coaxial with the surface 62 of the ball 16. The surface 54 has a dove-tailed notch or groove 56 into which is fitted a resilient seat ring 58, which is mechanically held in the groove 56, by means of the dove tails. The resilient seat ring 58 has a surface 68, which is substantially parallel to the surface 54 and is spaced from the surface 62 of the ball by a selected distance 70.

On the surface 62 of the ball there is a circular ring 64 of selected metal, of selected wire diameter, which is attached to the surface 62 by means of welds, or brazing 66. This welding or brazing must provide a complete seal between the wire and the surface 62 as well as provide mechanical support for the wire. This wire ring forms a ridge on the ball. The ridge has a small radius of curvature so that it can penetrate and depress the surface 68 of the resilient ring a selected distance so as to provide a sufficient internal compression in the resilient seat ring so as to seal the contact between the ridge and the seat ring against fluid flow from the opening 48.

There are a plurality of circumferentially spaced small diameter radial openings 60 drilled from the outer surface 72 of the seal ring. These terminate and project into the base surface of the groove 56. The purpose of these openings is to permit the fluid pressure in the flow passage 48 pressing on the resilient ring 58 to provide a force and a seal to maintain the seat ring 58 in the groove 56.

In the conventional type of ball valve, the surface 68 of the resilient seat ring 58 would normally be in contact with and press against the surface 62 of the sphere. However, to get a high unit pressure between the surface 62 and the ring would, over a broad surface of contact, require a very substantial force pressing the seat ring against the surface. This high force would provide considerable friction to the rotation of the ball in changing from an open to a closed position, etc. By the addition of the ridge 64 to the surface 62 the high unit pressure inside the resilient material can be obtained with a much smaller total force between the ridge of the ball and the resilient ring. Consequently, as the ball is rotated the friction of the ball ridge against the ring is much less and there is less chance of damaging and tearing the surface of the resilient material.

This improved design provides a higher degree of seal between the ball and the seat ring with less friction to the rotation of the ball from and to a closed position.

While the invention has been described with a certain degree of particularity, it is manifest that many changes may be made in the details of construction and the arrangement of components. It is understood that the invention is not to be limited to the specific language used or the specific embodiment set forth herein by way of exemplifying the invention, but the invention is to be limited only by the scope of the attached claim or claims, including the full range of equivalency to which each element or step thereof is entitled.

What is claimed is:

1. A ball valve having improved sealing capability comprising:
   (a) a housing having a flow opening therethrough, and having means to connect said flow opening into a pipe system;
   (b) a ball having an axial opening therethrough, and axial means to support, and to rotate, said ball in said housing, said axial means at right angle to said flow opening, and means to seal said axial means in said housing, whereby said ball can be rotated from outside said housing so that said axial opening is coaxial with said flow opening;
   (c) at least one metal seal ring, and means to seal said seal ring in said housing in a position where it is coaxial with said flow opening, said seal ring having a resilient seat ring inserted into one face thereof; and
   (d) at least one circular ridge on the surface of said ball, in such a position that when said ball is turned so that said axial opening is perpendicular to said flow opening, said ridge will be coaxial with said resilient seat ring, and in contact therewith, with a selected force of contact, the circular ridge being in the form of a ring of wire of circular cross-section, the ring of wire being fully exterior of the spherical surface of said ball and welded to ball along both sides of the ring of wire;
   whereby said ring will penetrate a selected distance into, and depress the surface of said seat ring, to seal against a selected fluid pressure in said flow opening.

2. The valve as in claim 1 in which said resilient seat ring is inserted into a dove-tailed groove in one face of said seal ring.

3. The valve as in claim 2 in which said seal ring includes a plurality of small openings drilled in said ring communicating with said dove-tailed groove; communicating with said dove-tailed groove;
   whereby the fluid pressure in said flow opening will hold and seal said resilient seat ring in said dove-tailed groove.

* * * * *